United States Patent [19]

de Lorenzo et al.

[11] Patent Number: 4,535,134
[45] Date of Patent: Aug. 13, 1985

[54] METHOD AND APPARATUS FOR CONTROLLING THE DISCHARGE OF PRODUCT FROM VAPOR PHASE POLYMERIZATION OF MONOMERS IN A HORIZONTAL STIRRED-BED REACTOR

[75] Inventors: Mark X. de Lorenzo, Webster; Charles R. Hoffpauir; Johnnie R. Hutchins, both of Alvin; Timmy R. Meyer, Webster; John E. Page, Friendswood; Michael E. Poehl, Lake Jackson, all of Tex.

[73] Assignee: Standard Oil Company (Indiana), Chicago, Ill.

[21] Appl. No.: 480,833

[22] Filed: Mar. 31, 1983

[51] Int. Cl.³ ............................................. C08F 2/34
[52] U.S. Cl. ..................... 526/88; 422/135; 526/352
[58] Field of Search ............................... 526/88, 352

[56] References Cited

U.S. PATENT DOCUMENTS 4,129,701 12/1978 Jezl ..................................... 526/352

Primary Examiner—Paul R. Michl
Attorney, Agent, or Firm—Wallace L. Oliver; William T. McClain; William H. Magidson

[57] ABSTRACT

A method and apparatus are disclosed for metering the removal of polymer or copolymer from the take-off end of a horizontal vapor phase polymerization stirred-bed reactor. The take-off zone discharge apparatus comprises a drain valve, which can seal off the reactor when needed, followed by an automatic discharge ball valve, which controls the discharge of product from the reactor. The discharge apparatus limits vapor losses, outlet pluggage, and downtime on the reactor. The discharge apparatus also can be operated for allowing residence time flexibility, increased catalyst yields, and improved product quality.

13 Claims, 4 Drawing Figures

METHOD AND APPARATUS FOR CONTROLLING THE DISCHARGE OF PRODUCT FROM VAPOR PHASE POLYMERIZATION OF MONOMERS IN A HORIZONTAL STIRRED-BED REACTOR

BACKGROUND OF THE INVENTION

This invention relates to the production of polymers and copolymers and, more particularly, to the vapor state polymerization of a polymerizable monomer or mixture of monomers to produce normally solid polymeric substances. Specifically, the invention is directed to a method and apparatus for controlling the removal of polymeric product following the polymerization of the monomer or mixture from the vapor state by an essentially isobaric process using a high yield catalyst and, optionally, cocatalyst in a horizontal, quench-cooled, stirred-bed reactor preferably having essentially total reactor off-gas recycle.

One of the problems with solution or slurry polymerization of monomers is the capital cost required in the production of polymeric product. Monomer polymerization using a vapor state process can be considerably more economical if certain problems inherent in vapor state polymerization can be solved. These include problems of carrying out the polymerization in a thermally controlled fashion so as to avoid hot spots, maintaining a proper product particle size distribution, and, in the case where catalysts are used which have high yields but are extremely sensitive to poisoning, decreasing to a minimum the amount of make-up material seen by the catalyst per amount of product formed. Another problem related to certain catalyst combinations is the narrow molecular weight distribution of the products formed with these catalysts.

U.S. Pat. Nos. 3,965,083; 3,971,768; 4,101,289; and 4,129,701, assigned to the assignee of this application, disclose a horizontal reactor for the essentially isobaric, vapor phase polymerization of polymerizable monomers using essentially total reactor off-gas recycle and a quench-cooled, stirred-bed mode of operation. By the term vapor phase process or reactor is meant a process or reactor, the monomer or monomers of which are vapors or gases under the conditions prevailing in the reactor.

The reactor can have one or more polymerization sections, and, preferably, there are at least two sections separated from each other by weirs or other suitably shaped barriers to prevent gross back-mixing between sections. Each section can be individually controlled in terms of polymerization temperature and polymer production rate so that a polymeric product having a controlled spread of molecular weight and particle size can more easily be produced.

The reactor introduces catalyst components and quench liquid into the polymerization sections directly onto and into the stirred, subfluidized bed of polymer forming from the polymerization of monomer from the vapor phase in and over such polymer bed. Provision can be made in the multiple section reactor to introduce the catalyst components and quench liquid at different rates into the different sections of the reactor to aid in individual control of the polymerization temperatures and polymer production rates of the various sections. The reactor introduces monomer or a mixture thereof and, optionally, hydrogen largely or wholly underneath the polymer bed. The polymer solid is continuously removed by passing through a take-off barrier generally at one end of the reactor into a take-off vessel.

Preferably, reactor off-gases are removed along the top of the reactor after extracting entrained polymer fines as completely as possible from the off-gases. The reactor off-gases are then taken to a separation zone where the quench liquid is at least in part separated along with any further polymer fines and some of the catalyst components from the monomer and hydrogen, if used, which monomer and hydrogen are then recycled to inlets spaced along the various polymerization sections of the reactor and located largely or wholly underneath the surface of the polymer bed. A portion of the quench liquid including the further polymer fines is taken off the separation zone and in major part returned to inlets spaced along the top of the reactor. A minor part of such quench liquid, purified of polymer fines and catalyst components, is fed into a catalyst make-up zone for catalyst diluent so that fresh quench liquid need not be introduced for that purpose.

The reactor disclosed in U.S. Pat. Nos. 3,965,083; 3,971,768; 4,101,289; and 4,129,701 largely or completely solves the above referred to problems related to solution or slurry polymerization and reaps important economic benefits through savings in energy consumption, raw materials, and capital costs. However, the known systems for removal of polymeric product from the reactor have resulted in significant reactor downtime and high maintenance costs.

As generally indicated above, the polymer is continuously removed as particulate by passing through the take-off barrier at one end of the reactor into a take-off vessel. In accordance with one known system, the polymer bed level is maintained at the level of an opening in a retaining weir at the take-off end of the reactor. The polymer overflow spills out into a take-off zone and is intermittently removed as particulate through a double ball-valved lock chamber attached to the take-off end of the reactor. The known system comprises a manual isolation ball valve, an automatic inlet ball valve, a blowcase, and a discharge ball valve. In order to discharge product, the inlet ball valve is opened for a specific time, thereby allowing powder to fill the blowcase. After closing the inlet ball valve, the discharge ball valve then opens, thereby discharging the powder from the blowcase via pressure build-up to a powder separation drum.

The following problems have been experienced with the known system. The inlet ball valve occasionally freezes up while cycling, thereby causing pluggage of the downstream discharge elements such as the discharge ball valve. Repairs usually require a reactor shutdown since the isolation ball valve often freezes open. When the discharge ball valve becomes plugged with polymer, powder then builds up in the blowcase. Without proper cooling, the heat of reaction melts the powder, thereby resulting in a fused lump of polymer causing blowcase pluggage. Since the reactor cannot be reliably isolated, the reactor must be shut down whenever the discharge ball valve or blowcase becomes plugged with polymer. Furthermore, in the known system, particulate flows through the opening in the retaining weir into the take-off zone and falls into the blowcase. Since a powder seal cannot be maintained above the discharge ball valve, a large amount of monomer gas leaves with the polymeric product, thereby resulting in excessive gas blowby. This causes monomer losses, as well as high pressures in the powder separation drum. In one aspect, this invention provides a solution to these operational problems.

Additionally, the reactor is particularly adapted for use with catalysts which have a high enough polymerization yield that catalyst residues need not be removed from the polymeric product during the polymer finishing process. However, the quality of product produced in a horizontal vapor phase polymerization stirred-bed reactor does not always equal that of the slurry process because of the catalyst residue left in the gas phase product. The amount of residual catalyst can be reduced by two techniques, developing an improved high yield catalyst, which is beyond the scope of this invention, and/or increasing the reactor residence time, either by extending the reaction time and thereby decreasing the polymer throughput or, alternatively, by increasing the effective reactor volume. Previously, the effective reactor volume and thus residence time as disclosed in U.S. Pat. Nos. 3,965,083; 3,971,768; 4,101,289; and 4,129,701 has been limited by the weir height. Variation of the polymer bed level to increase residence time has required that the weir(s) be replaced which is economically impractical. In another aspect, this invention provides a solution to the problem of controlling residence time without decreasing the polymer throughput or replacing the weir(s).

SUMMARY OF THE INVENTION

The invention provides a method and apparatus for controlling product discharge from a horizontal vapor phase polymerization stirred-bed reactor. In accordance with the invention, a method for discharging polymeric product in powdered form from the take-off end of a horizontal vapor phase polymerization stirred-bed reactor comprises the steps of: (a) setting a rate for discharging powdered polymerized monomer when the reactor is operating in a steady state so as to maintain a powder level above a discharge port at the take-off end of the reactor; and (b) actuating a take-off zone discharge apparatus at the set rate for removing powdered polymerized monomer from the discharge port below the powder level. This provides the advantage of reducing gas blowby.

In accordance with another aspect of the invention, a method for discharging polymeric product in powdered form from the take-off end of a horizontal vapor phase polymerization stirred-bed reactor comprises the steps of: (a) sensing the level of the powdered polymerized monomer bed when the reactor is operating in a steady state so as to maintain a powder level above a discharge port at the take-off end of the reactor, the bed level being correlated to the force required for stirring the polymerized monomer; and (b) actuating a take-off zone discharge apparatus for removing powdered polymerized monomer from the discharge port in response to the sensed bed level for maintaining a powder level above the discharge port. This provides the advantage of reducing gas blowby. Preferably, since the agitator drive motor load is correlated to the bed level, the level of the bed is controlled by sensing the load on the motor and discharging polymer to maintain the current drawn by the motor at a preselected value. The polymer bed level can be controlled in response to an agitator drive motor amperage signal, which allows the bed level to be controlled at any height desired. When the agitator is initially started in the unstirred powder bed, the agitator drive motor draws a peak power load. The weir height is preferably set so that the resistance force created by the dead powder bed is approximately that available from the agitator drive motor. Once the polymer bed is stirred, the required agitator drive motor power requirement is greatly reduced so that the surplus motor power can be used to vary the level of the polymer bed above the weirs, thereby controlling the residence time. The operating volume in the reactor can be increased over that allowed previously, thereby significantly increasing catalyst yields and reducing catalyst residue in the product. Preferably, in accordance with the invention, a polymerizable monomer or mixture thereof can be economically and efficiently converted to polymeric substances with a high yield catalyst and, optionally, cocatalyst by a vapor phase, essentially isobaric, polymerization process using a horizontal, stirred-bed, quench-cooled, essentially total reactor off-gas recycle reactor having a take-off zone discharge apparatus comprising a drain valve means, which can seal off the reactor when needed, followed by an automatic discharge ball valve means, which controls the discharge of product from the reactor.

One embodiment of apparatus in accordance with the invention for the vapor phase polymerization of at least one polymerizable monomer comprises; (a) a horizontal reactor containing a centrally located drive shaft extending longitudinally through said reactor to which is attached an agitator extending transversely within and to a short distance from the internal surface of said reactor, said reactor being divided into at least two sections by barrier means for controlling movement of polymerized monomer between said sections; (b) driving means for said drive shaft; (c) at least one reactor off-gas outlet along the topward portion of said reactor; (d) at least one vapor recycle inlet along the bottomward portion of said reactor; (e) at least one catalyst addition inlet along said reactor; (f) a plurality of quench liquid inlets spaced along said reactor so that quench liquid can be introduced into said sections of said reactor; and (g) take-off means for said polymerized monomer along the bottomward portion of said reactor near one end of said reactor for discharging said polymerized monomer through a discharge port in said reactor, said take-off means comprising: (1) a drain valve means for selectively sealing off said reactor in series with (2) an automatic discharge ball valve means for controlling the discharge of polymerized monomer from said reactor when said reactor is not sealed off by said drain valve means. The driving means is preferably an electrical motor, and the automatic discharge ball valve means is actuated by an amperage indicator controller circuit which senses the load on the motor driving the agitator of the reactor.

The invention offers advantages over known horizontal vapor phase polymerization stirred-bed reactor discharge systems. The advantages include the capability of controlling the powder level over the discharge port, thereby improving monomer yield due to reduced losses; utilizing more reactor volume, thereby increasing catalyst yields; reduced maintenance costs; and higher operating factor due to less downtime.

GENERAL DESCRIPTION

The method and apparatus described herein can be applied to the polymerization of polymerizable monomers which are polymerizable below the softening point of their polymeric forms including ethene, propene, 4-methyl-pentene-1, butene-1, vinyl chloride, butadiene, styrene, PET, and mixtures of such monomers. Particularly suitable are the polymerization of ethene and propene.

In accordance with the invention, a process and reactor are provided which can economically and efficiently convert a polymerizable monomer or a mixture thereof to polymeric substances in a vapor phase, essentially isobaric polymerization process, which reactor is a stirred-bed, quench-cooled, horizontal reactor with essentially total reactor off-gas recycle capable of multiple temperature operation. The process and reactor are characterized by a stirred agitation of the subfluidized polymer bed by transversely oriented paddles connected to a longitudinally oriented drive shaft typically located centrally in the reactor and by segmentation of the reactor into polymerization sections preferably separated one from another by suitable barriers such as weirs, such sections capable of being individually controlled with respect to polymer production rates and polymerization temperatures and, if desired, partial pressures of the reactor gases as well. The invention provides a discharge method and apparatus at the take-off end of such a reactor. The discharge apparatus comprises a drain valve followed by an automatic discharge ball valve. The purpose of the drain valve is to seal off the reactor whenever needed. The function of the automatic discharge ball valve is to control the polymer bed level in the reactor by regulating the powder discharge rate. During operation, the drain valve remains open while the automatic discharge ball valve operates off a control circuit, preferably an agitator drive motor load sensing circuit or, in another embodiment, a timer circuit, for controlling the polymer bed level.

Figure 1:
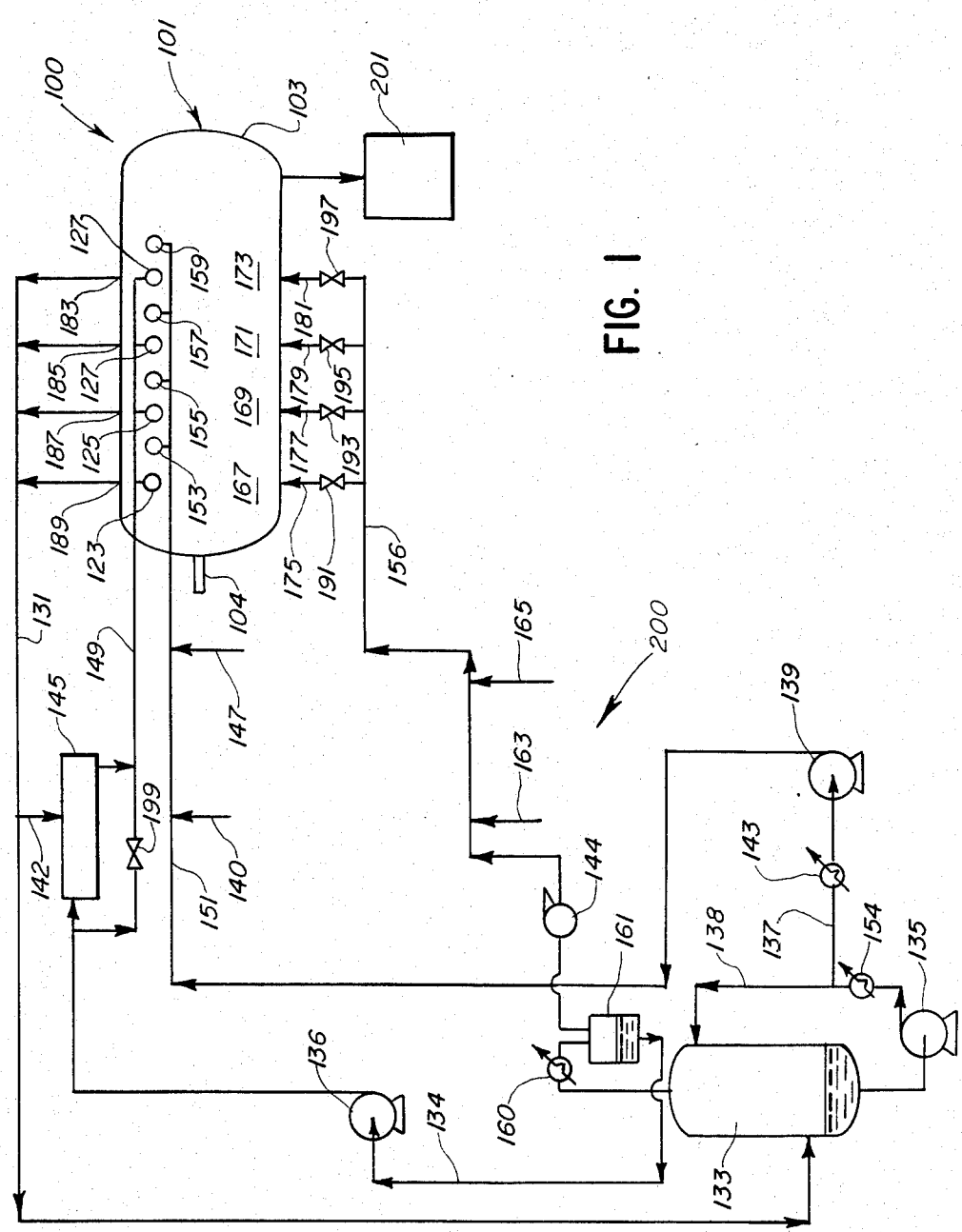
FIG. 1 shows one embodiment of an essentially isobaric polymerization process with essentially total reactor off-gas recycle useful in explaining the invention.

A process using the reactor of this invention is shown in detail in FIG. 1. FIG. 1 can be divided roughly into two areas, the reactor area, generally indicated by the numeral 100, and the reactor off-gas treatment (separation) and catalyst make-up area, generally indicated by the numeral 200.

As shown in FIG. 1, the reaction volume of a horizontal polymerization reactor 101 is divided into several stirringly agitated sections 167, 169, 171, and 173 to provide for the possibility of operating the different sections of the reactor at different temperatures and/or different polymer production rates. Polymerization takes place in the reaction sections 167, 169, 171, and 173 to form a polymer bed distributed throughout the reactor 101, and the polymerization temperature of each of the sections can be individually controlled by a combination of techniques including the stirring agitation, the controlled differential introduction of vapor recycle into each of the sections through inlets 175, 177, 179, and 181 spaced along the bottom of the reactor, and the introduction into each of the sections of inert quench liquid and catalyst components at different rates through quench liquid inlets 153, 155, 157, and 159 and catalyst inlets 123, 125, 127, and 129 spaced along the top of the reactor.

Reactor off-gases are removed through outlets 183, 185, 187, and 189. Since a certain deleterious amount of polymer fines can be produced in the reactor 101, they advantageously are substantially removed prior to transfer of the reactor off-gases to the reactor off-gas treatment and catalyst make-up area 200 by using traps, filters, settlers, cyclones, or scrubbers or a combination thereof.

Polymer solid is produced in each of the stirringly agitated reaction sections 167, 169, 171, and 173. Due to the continued production of such polymer, the amount of polymeric product constantly passes to the take-off end 103 of the reactor 101.

In general, the catalysts which are most useful are those which are very active and give a high yield on catalyst. Included in this group are cocatalysts composed of organometallic compounds of Periodic Groups IA, IIA, and IIIA and catalysts which are based on transition metal compounds. Aluminum alkyl compound cocatalysts are especially preferred and can be a trialkylaluminum or an alkyl aluminum halide such as a dialkylaluminum chloride. The transition metal catalyst can be a metal compound of Group IV or Group V such as a titanium or vanadium compound, a compound of Group VI such as chromium or molybdenum oxide, or can be one of the above catalysts supported on a magnesium-based support or a support such as alumina, silica, or silica-alumina.

The preferred catalysts and cocatalysts are high yield catalysts. By high yield is meant catalysts and cocatalysts the residues of which do not have to be removed from the polymeric products of the process.

The preferred catalysts and cocatalysts for ethene polymerization are a trialkylaluminum cocatalyst with a catalyst which is a titanium compound supported on a magnesium-based support or chromium oxide supported on alumina silica, or combinations thereof. For propene polymerization it is preferable to use a dialkylaluminum chloride cocatalyst and a catalyst which is an active titanium trichloride. However, the process and reactor described herein are not meant to be limited to the catalyst and cocatalyst used except in that the process and reactor operate best using high yield catalysts.

The quench liquid used for temperature control is a readily volatilizable liquid which can be sprayed onto the surface of the polymer bed to evaporatively conduct heat away from the bed and therefore must be inert to the monomer being polymerized, the catalyst components used in the polymerization, and have as high a heat of evaporation as is consistent with ready volatilization of the quench liquid in the reactor 101 at the polymerization temperature. In general, alkanes such as propane, a butane, a pentane, or a hexane or closely boiling mixtures thereof can be used. The preferred quench liquid for ethene is isobutane or isopentane. It should be understood that where the monomer to be polymerized is readily condensible, for example, propene, the quench liquid can be liquified monomer or a mixture of liquified monomer and an additional quench liquid.

The rate of quench liquid addition is preferably low enough to keep the polymer bed dry, that is, maintain the partial pressure of the quench liquid vapor below the dew point, yet large enough to obtain the maximum cooling effect of the quench liquid. Generally, the quench liquid carries away 50 percent or more of the heat of polymerization. In the case of propene polymerization, over 90 percent of the heat of polymerization is desirably removed by the quench liquid. At a 200° F. polymerization temperature in the polymerization of ethene, desirably more than 70 percent of the heat of polymerization is removed using isobutane, and more than 50 percent of the heat is removed using isopentane.

Catalyst, dissolved or slurried in recycle quench liquid, is advantageously introduced onto the surface of the polymer bed in at least one of the various reaction sections 167, 169, 171, and 173 through the inlets 123, 125, 127, and 129 in FIG. 1. Similarly placed inlets 153, 155, 157, and 159 are used to introduce the recycle quench liquid, which can contain cocatalyst, onto the polymer bed in the individual reaction sections 167, 169, 171, and 173. However, depending upon the nature of the catalyst, cocatalyst, and monomer to be polymerized, catalyst and/or cocatalyst can be sprayed or otherwise introduced into the reactor neat or in other non-polymerization vehicles. Alternatively, for some monomers, catalyst and cocatalyst can be added to a make-up zone 145 and together added to the reactor 101.

It has been found advantageous to make the catalyst and quench liquid inlets concentric so that the catalyst and quench liquid are sprayed into the reactor 101 and onto the surface of the polymer bed in such a way as to more evenly distribute the catalyst on the bed surface. However, the catalyst and quench liquid inlets can be made separate and the catalyst and quench liquid introduced separately onto the polymer bed.

The recycle system and reactor are so designed that they operate essentially isobarically. That is, no more than the normal operating pressure variations are present. Preferably, the reactor 101 and recycle system pressure variations are no more than ±25 psig and, more preferably, no more than ±10 psig.

As shown in FIG. 1, the reactor off-gases are taken via a line 131 to a scrubber tower 133 wherein at least part of the quench liquid component of the off-gases, further polymer fines, and some of the catalyst components are removed from the polymerizable monomer and hydrogen, if used. The polymerizable monomer and hydrogen together with some quench liquid vapor are returned to the reactor 101 from the top of the scrubber tower 133, after, advantageously, passing through a heat exchanger 160 and a separator 161 to condense out additional quench liquid. The recycle monomer and hydrogen together with the quench liquid vapor then flow via a blower 144 and a vapor recycle line 156 with additional hydrogen and monomer make-up being added via lines 163 and 165. Alternatively, monomer and hydrogen can be returned from the scrubber tower 133 to the reactor 101 bypassing the heat exchanger 160 and separator 161. The amount of vapor recycle introduced into the individual reaction sections 167, 169, 171, and 173 via the inlets 175, 177, 179, and 181 can be individually controlled by valves 191, 193, 195, and 197 and the polymer bed thereby kept in a subfluidized state. The quench liquid from the separator 161 is essentially free of polymer fines and catalyst components and suitable for use in the catalyst make-up zone 145.

Quench liquid separated from the reactor off-gases is pumped by a pump 135 to a heat exchanger 154. The quench liquid is cooled by the heat exchanger 154 and returned in major portion to the top of the scrubber tower 133 via a line 138. A minor portion of the quench liquid is returned through a line 137, heat exchanger 143, pump 139, and quench liquid recycle line 151 to quench liquid inlets 153, 155, 157, and 159 carrying with it some monomer, hydrogen, catalyst, and any polymer fines carried by the off-gases into the scrubber tower 133. Quench liquid make-up can be added via a line 140. A small portion of quench liquid essentially free of polymer fines and catalyst components is taken off the separator 161 and passed through a line 134 and pump 136 to the catalyst make-up zone 145 for catalyst make-up purposes. If cocatalyst is used, make-up cocatalyst can be added to the catalyst make-up zone 145, injected directly into the recycle quench liquid stream through a line 147, or can be added directly in a nonpolymerizable vehicle into the reactor 101.

Polymerization in the catalyst make-up zone 145 or an associated line 149 and the inlets 123, 125, 127, and 129 can cause serious plugging problems and can be controlled by keeping the cocatalyst concentration in the catalyst make-up zone 145 below a certain value, which value depends upon the identity of the catalyst and cocatalyst used and the monomer to be polymerized. Where make-up cocatalyst is added to the catalyst make-up zone 145, provision can be made to prevent polymerization from occurring in the associated line 149, for example, by cooling the make-up zone or decreasing the residence time of the catalyst components therein. Alternatively, make-up quench liquid from the line 147 can be used in the catalyst make-up zone 145 in place of recycle quench liquid to prevent polymerization of monomer in the catalyst make-up zone.

A valve 199 is provided in the catalyst make-up zone bypass line in order to more easily vary the concentration of catalyst in the catalyst make-up introduced into the reactor 101. It has been found that the particle size of the polymer produced in the reactor 101 can be advantageously varied by varying the concentration of the catalyst being introduced through the inlets 123, 125, 127, and 129. Further, it has been found advantageous to vary the catalyst concentration either by changing its concentration in the catalyst make-up zone 145 or, additionally and alternatively, to change its concentration by introducing quench liquid into the catalyst line 149 via the valve 199 just prior to the point where the catalyst enters the inlets 123, 125, 127, and 129. Make-up catalyst is added through a line 142.

Weirs, if used, can be attached to a drive shaft 104 with slip rings or fixed to the walls of the reactor 101 and are beneficially oriented so that the tops of the weirs are roughly aligned with the polymer bed orientation during agitation. This provides for spill-over along the entire length of each weir top. However, the tops of the weirs can be oriented horizontally, if desired. Other types of barriers can be used in place of weirs to prevent gross back-mixing between the reaction sections 167, 169, 171, and 173. For example, thin wall barriers attached to the drive shaft 104, which fill the reactor cross-section and have one or more holes cut in them, can be used.

The polymer solid which builds up in the reactor 101 traverses the length of the reactor 101 essentially because of polymer build-up in the reactor bed and not by the stirring agitation. This condition is assured by the paddle configuration used which provides for agitation but not for backward or forward movement of the polymer bed. Particles in the polymer bed adjacent to the take-off end 103 are swept by the stirring to the take-off zone. The take-off zone discharge apparatus in accordance with the invention is generally indicated by the numeral 201 in FIG. 1.

The polymer can be taken off without substantial pressure letdown in such a way that the solid is melted and the resulting molten polymer treated with kill substance and additives and devolatilized while still in the molten state and then finished into commercially sized product. Preferably, the polymer solid is taken off in accordance with the invention, treated with additives, and melt extruded.

DESCRIPTION OF THE PREFERRED EMBODIMENTS

Figure 2:
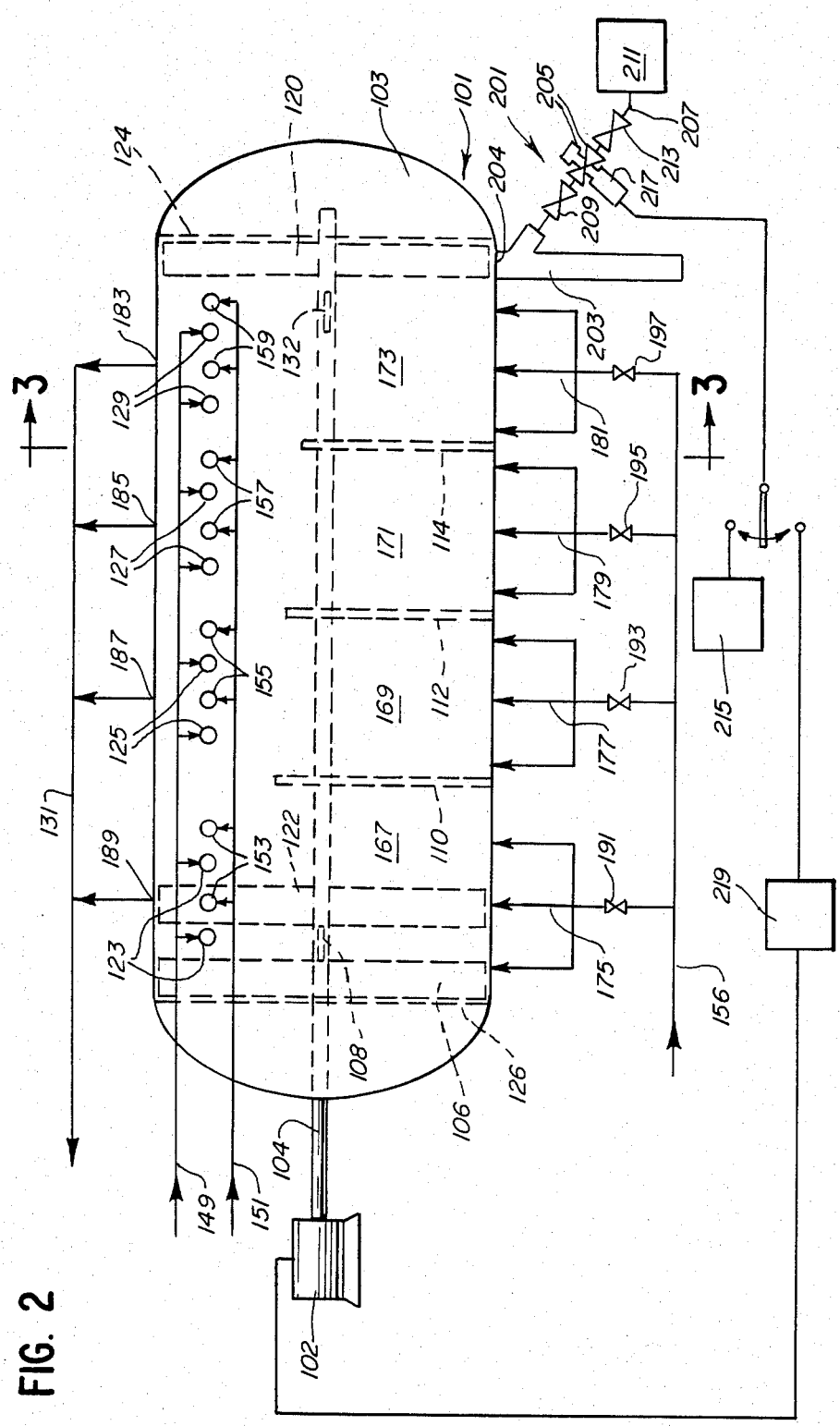
FIG. 2 shows a longitudinal view of one embodiment of the reactor described herein.

FIG. 2 shows in detail the reactor 101. The interior of the reactor 101 is composed of the individually controllable reaction sections 167, 169, 171, and 173 can be separated from one another by weirs 110, 112, and 114, which weirs preferably extend upwardly to somewhat over the middle of the reactor at a height equal to the unfluidized polymer bed surface. In a preferred embodiment, weirs 110, 112, and 114 are constructed in height so that the polymer bed fills about half the volume of the reactor. As the solid polymer exceeds the weir height, it falls into the adjacent reaction section 167, 169, 171, and 173 migrating in the direction of the take-off end 103.

When it is desired to operate with two or more gas compositions (different hydrogen concentrations) as well as different section temperatures, all the section barriers are constructed as above except for the one or more dividing structures which divide the reactor 101 into the compartments of different gas compositions. The dividing structures are in such a case composed of thin wall barriers extending upwardly and filing the cross-section of the reactor 101 and containing an opening situated beneath the level of the polymer bed for polymer solid movement. Gas intermixing between the compartments is thereby controlled. Operating in such a variable gas composition mode, the individual compartments preferably have separate reactor off-gas recycle treatments and returns and can have separate hydrogen and monomer make-ups. Generally, the dividing structures prevent extensive intermixing of the vapors between the individual compartments. However, in one mode of multiple hydrogen operation, the vapors are deliberately mixed by feeding the vapors from the hydrogen poor compartment to the hydrogen rich compartment and adding make-up monomer primarily to the hydrogen poor compartment and hydrogen make-up primarily to the hydrogen rich compartment. Alternatively, two or more separate reactors can be used in series if it is desired to operate with two or more gas compositions.

The interior of the reactor 101 is equipped with the drive shaft 104 extending longitudinally through the reactor to which are attached paddles 106, 108, 120, 122, and 132 extending transversely from the shaft and making close clearance with the inside wall of the reactor to assure adequate polymer bed mixing at the reactor wall. The paddles are preferably flat to maximize polymer bed agitation for a given rotational speed, and preferably two paddles per impellor are used. The width of the paddles is such that between about four and about twelve impellors (eight to twenty-four paddles) are present in a reactor section of about three feet in length. The orientation of the paddles on adjacent impellors is about ninety degrees. The paddles are constructed to minimize any forward or backward movement of the polymer bed during stirring and are driven by an agitator drive motor 102 at such a speed as to give a slow and regular turnover of the entire bed contained in the reactor 101. The agitator drive motor 102 is preferably an electrical motor. The speed at which the impellors turn is preferably fast enough to provide the desired heat and mass transfer between liquid, solid, and gas but not so fast that the finer portions of the polymer bed are thrown up in large quantities into the space above the bed. That is, the speed typically is about five to about thirty RPM so that the integrity of the polymer bed is maintained.

A plurality of catalyst and quench liquid inlets can be used in the reactor 101, and one or more pairs of catalyst and quench liquid inlets can be used for each reaction section 167, 169, 171, and 173. The catalyst and quench liquid inlets are typically designed so that the catalyst and quench liquid are distributed onto the top of the agitated polymer bed at roughly the same location. Such introduction of catalyst and quench liquid combined with slow agitation has been found to provide more uniform polymerization and prevent localized fusion in the polymer bed and hence reduces the number of molten plugs of polymer formed and gives more trouble-free performance of the reactor. It is advantageous in one mode of carrying out polymerization in the reactor 101 to provide for separately controlled addition of catalyst components and quench liquid into the various sections by means of, for example, valves. Such separately controlled additions into reaction sections 167, 169, 171, and 173 help provide separate control of polymerization temperatures and polymer production rates among the sections and can be used to vary and control the molecular weight and particle size distribution of the polymer.

If the polymerization temperature of one or more of the reaction sections 167, 169, 171, and 173 is held at a different value than in the other section or sections (dual temperature operation or multi-temperature operation), it is advantageous to vary the concentrations of any or all of the catalyst components being introduced into the various sections. Particle size distribution and molecular weight distribution are advantageously affected thereby. This can be accomplished by feeding the catalyst inlets of the different sections individually. Even in single temperature operation, it can be advantageous to feed one or more of the reaction sections 167, 169, 171, and 173 with catalyst components at different concentrations than catalyst components being introduced into the other section or sections.

The overall reactor temperature range for polymerization depends upon the particular monomer which is being polymerized and the commercial product desired. In general, the temperature range used varies between about 40° C. up to about the softening temperature of the polymer bed. The total polymerization pressure is composed of the polymerizable monomer pressure, vaporized quench liquid pressure, and hydrogen pressure, if used, and such total pressure typically can vary from above about atmospheric to about 600 psig. The individual partial pressures of the components making up the total pressure determine the rate at which polymerization occurs, the molecular weight, and the molecular weight distribution of the polymer to be produced.

The vapor recycle which includes the polymerizable monomer or monomers and hydrogen, if used, is brought in through the vapor recycle line 156 to the vapor recycle inlets 175, 177, 179, and 181 at a rate designed to prevent fluidization of the polymer bed.

The rate at which the vapor recycle gases are introduced into the individual reaction sections 167, 169, 171, and 173 can be controlled by valves 191, 193, 195, and 197, and such control can be used to help vary the section polymerization temperatures and polymer production rates if desired. False end plates inserted in the reactor 101 for mechanical construction purposes are shown at 124 and 126.

Figure 3:
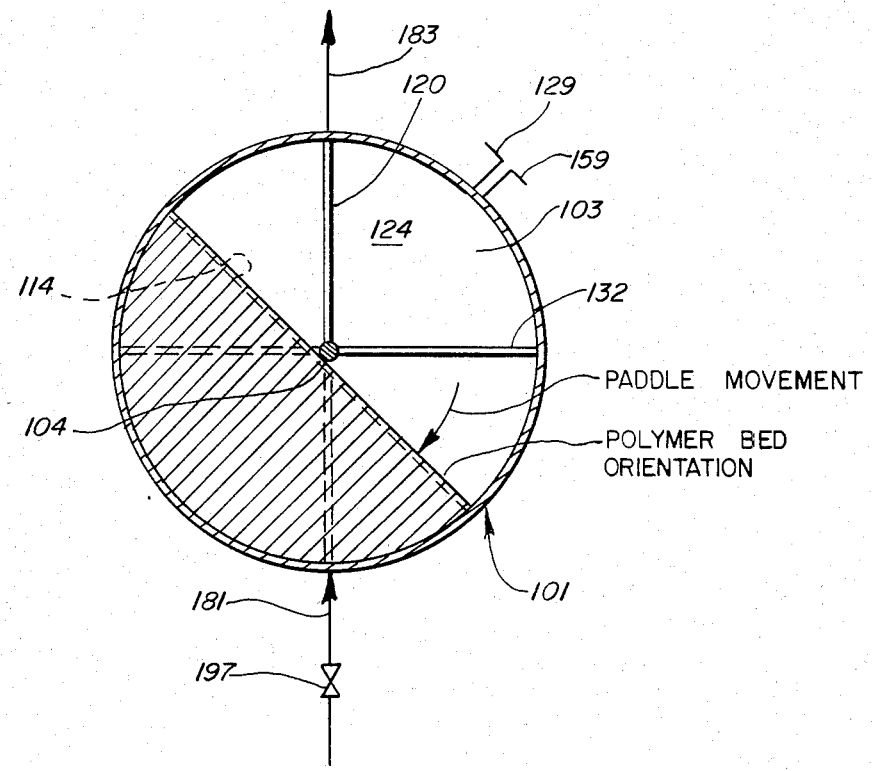
FIG. 3 shows a transverse view of such reactor along line 3—3 of FIG. 2.

In FIG. 3 a view of the reactor 101 is shown along line 3—3 of FIG. 2. FIG. 3 shows the ninety degree orientation of the paddles 120 and 132 on adjacent impellors at the take-off end 103. Further, FIG. 3 shows the orientation of the weir 114 and the polymer bed in the reactor 101 and the direction of paddle movement with respect to the bed orientation.

As shown in FIG. 2, the take-off zone discharge apparatus 201 basically includes a drain valve 203 connected to a discharge port 204 at the take-off end 103 of the reactor 101. The drain valve 203 is preferably a conventional valve having a valve stem which is selectively actuable between a closed position, in which the valve stem rests on a valve seat, thereby sealing off the reactor 101, and an open position, in which the valve stem is moved away from the valve seat, thereby allowing polymer in powdered form to flow from the take-off end 103 of the reactor. Preferably, a level of powdered polymer is maintained above the discharge port 204 at the location where the drain valve 203 is connected to the take-off end 103 of the reactor 101, whereby gas blowby is reduced. It has been found important to use the drain valve 203 rather than a ball valve as used previously since the drain valve is less apt to become plugged with molten polymer than a ball valve. This is because the region in the vicinity of the valve seat of the drain valve 203 is less restricted than the throat of a ball valve, so that if molten polymer is present, there is less probability that the molten polymer will plug the valve, thereby causing the valve to freeze open or shut. The drain valve 203 can be, for example, a four-inch motor operated valve available from Strathman of Houston, Tex.

The discharge apparatus 201 also basically includes an automatic discharge ball valve 205. The automatic discharge ball valve 205 is connected to the drain valve 203 so that powdered polymer feeds to the ball valve when the drain valve is open. The automatic discharge ball valve 205 is selectively actuable between a closed position, in which the flow of powdered polymer from the drain valve 203 is blocked, and an open position, in which the powdered polymer is permitted to flow. The automatic discharge ball valve 205 can be, for example, a three-inch automatic ball valve manufactured by WKM, Houston, Tex. The powdered polymer which flows from the automatic discharge ball valve 205 is routed via a pipe 207 to a powder separation drum or other product finishing apparatus 211.

Preferably, as shown in FIG. 2, a ball valve 209 is interposed between the drain valve 203 and automatic discharge ball valve 205. The ball valve 209 serves as a safety valve for selectively sealing off the automatic discharge ball valve 205 from the drain valve 203. Also, another ball valve 213 is interposed between the automatic discharge ball valve 205 and the pipe 207 and serves as a safety valve for selectively sealing off the discharge apparatus 201 from the downstream product finishing apparatus 211. Both safety ball valves 209 and 213 are actuable between open and closed positions for passing and blocking the flow of powdered polymer, respectively, but in normal operation of the reactor 101 are in the open position.

The discharge apparatus 201 is characterized by the following features. The previously used isolation ball valve is replaced with a drain valve 203. The drain valve 203 is able to push powder plugs out of the way and reliably seal the reactor 101. Furthermore, the previously used automatic inlet ball valve is eliminated. Also, the blowcase is removed, thereby eliminating any dead space for polymer to build up and melt. Finally, a powder level can be maintained above the discharge port 204. The discharge apparatus 201 does not have a dead space. This minimizes gas blowby and consequent monomer losses.

The discharge apparatus 201 provides several advantages over previously known discharge systems. The advantages include reducing maintenance costs, increasing the operating factor due to less downtime, and improving monomer yield due to reduced monomer losses.

In view of the features and advantages of the discharge apparatus 201 as compared to the known discharge system previously used, the following example is given.

EXAMPLE I

A process was performed using two parallel vapor phase polymerization stirred-bed reactors described herein under the following process conditions:

Reactor Size—2@8 ft. diameter, 44 ft. length
Monomer—Propylene (99.7 mol percent)
Monomer Feedrate—16,600 lbs./hr. per reactor
Propane ($C_3H_8$) Feedrate—50 lbs./hr. per reactor
Hexane ($C_6H_{14}$) Feedrate—63 lbs./hr. per reactor
Catalyst—Titanium Trichloride ($TiCl_3$)
Catalyst Feedrate—1.88 lbs./hr. per reactor
Diethylaluminum Chloride Feedrate—6.58 lbs./hr. per reactor
Hydrogen Sulfide ($H_2S$) Feedrate—0.01 lb./hr. per reactor
2,4,6-Collidine Feedrate—0.07 lb./hr. per reactor
Hydrogen ($H_2$) Feedrate—1.0 lb./hr. per reactor
Temperature—160° F.
Pressure—300 psig
Bulk Density of Polypropylene Powder—30 lbs./ft.$^3$
Powder Inventory Per Reactor—50% level, 30,000 lbs.
Production Rate—15,075 lbs./hr.

The polymeric product produced by each of the reactors was discharged in accordance with the invention to the same product finishing apparatus 211.

Installation of the horizontal vapor phase polymerization stirred-bed reactor discharge apparatus of the invention reduced maintenance and downtime costs during a nine-month period. There were three less reactor shutdowns over the same period, resulting in reductions of 45,000 pounds in propylene flare losses and 90,000 pounds in off-spec production. Furthermore, in an effort to investigate monomer losses, a test was run on the earlier described known discharge system used previously, and the results showed that maintaining a powder level in the take-off zone reduces propylene monomer losses. Under the above process conditions, the propylene concentration in the fluid bed catalyst deactivator included in the product finishing apparatus 211 decreased from 38 to 29 mol percent. This resulted in a substantial monomer savings during the nine month period. The ability to run a powder level over the discharge port also lowered pressures in the powder separation drum included in the product finishing apparatus 211 from 8 to 3 psig.

In view of the preceding example, it is apparent that the preferred embodiment of the discharge apparatus of the invention, when operated in a mode wherein the weirs control the height of the polymer bed, produces significant advantages in terms of reductions in maintenance costs, downtime, and material losses, especially when the discharge apparatus is operated so as to maintain a powder level above the discharge port 204 of the reactor 101, thereby alleviating gas blowby and thus reducing monomer losses. In order to maintain a sufficient polymer powder seal above the discharge port 204, a timer circuit 215 shown in FIG. 2 can be used for controlling the intermittent discharge of polymer from the reactor 101. The timer circuit 215 is connected to an actuator 217 which controls the opening and closing of the automatic discharge ball valve 205. After the reaction in the reactor 101 reaches a steady state, the timer circuit 215 is set so that the automatic discharge ball valve 205 cycles at a rate sufficiently slowly to maintain a powder level above the discharge port 204 but rapidly enough to avoid back-up in the reactor 101. The powder level above the discharge port 204 maintains a powder seal to alleviate the problem of gas blowby.

In accordance with the invention, not only can a powder level be maintained above the discharge port 204 using the discharge apparatus 201, but the polymer bed level throughout the reactor 101 can be controlled by the discharge apparatus increasing the effective volume of the reactor and thus the residence time of the polymer within the reactor, thereby improving product quality. That is, residence time can be increased without decreasing the polymer throughput or replacing the weirs.

The automatic discharge ball valve 205 can be controlled by the timer circuit 215 and actuator 217 in a manner similar to that described above for controlling the polymer bed level throughout the reactor 101. That is, after the reaction within the reactor 101 has reached a steady state, the timer circuit 215 is set so that the polymer bed level throughout the reactor is maintained at the requisite level to provide a desired residence time. However, in the preferred embodiment wherein the polymer bed level is controlled throughout the reactor 101 in order to achieve a desired residence time, the actuator 217 for the automatic discharge ball valve 205 is controlled by an amperage indicator controller circuit 219 connected to the agitator drive motor 102.

The discharge apparatus 201, which includes the drain valve 203 followed by the automatic discharge ball valve 205, operates in the presence of a powder level. The amperage indicator controller circuit 219 uses a correlation which is based on the polymer bed level and relates the agitator drive motor amperage draw to a certain bed level for controlling the operation of the automatic discharge ball valve 205. The amperage indicator controller circuit 219 is set when the reactor 101 is in a steady state so that the actuator 217 operates the automatic discharge ball valve 205 for discharging polymer only if the current drawn by the agitator drive motor 102 is at least equal to the setting of the amperage indicator controller circuit, which occurs when the polymer bed level exceeds the desired bed level.

In operation, the reactor 101 is started with the polymer bed level equal to the weir height. Once the polymer bed is fluidized and the reaction is underway, the desired residence time is set by increasing the amperage control setting to give the desired bed level. That is, the surplus power which becomes available from the agitator drive motor 102 once the polymer bed is fluidized is advantageously used for adjusting the bed level. The preferred polymer bed level control method of the invention makes it possible to lower the bed level during agitator startup and then increase the bed level once the reaction is in progress, thereby allowing the reactor 101 to be started more quickly.

In accordance with the invention, the polymer bed level can be increased twofold over previously known bed levels, thereby doubling the reactor residence time and causing the catalyst residue in the product to decrease. Bed level control in accordance with the invention greatly increases the flexibility of introducing new products to the vapor phase process which are currently limited to the slurry process.

EXAMPLE II

Figure 4:
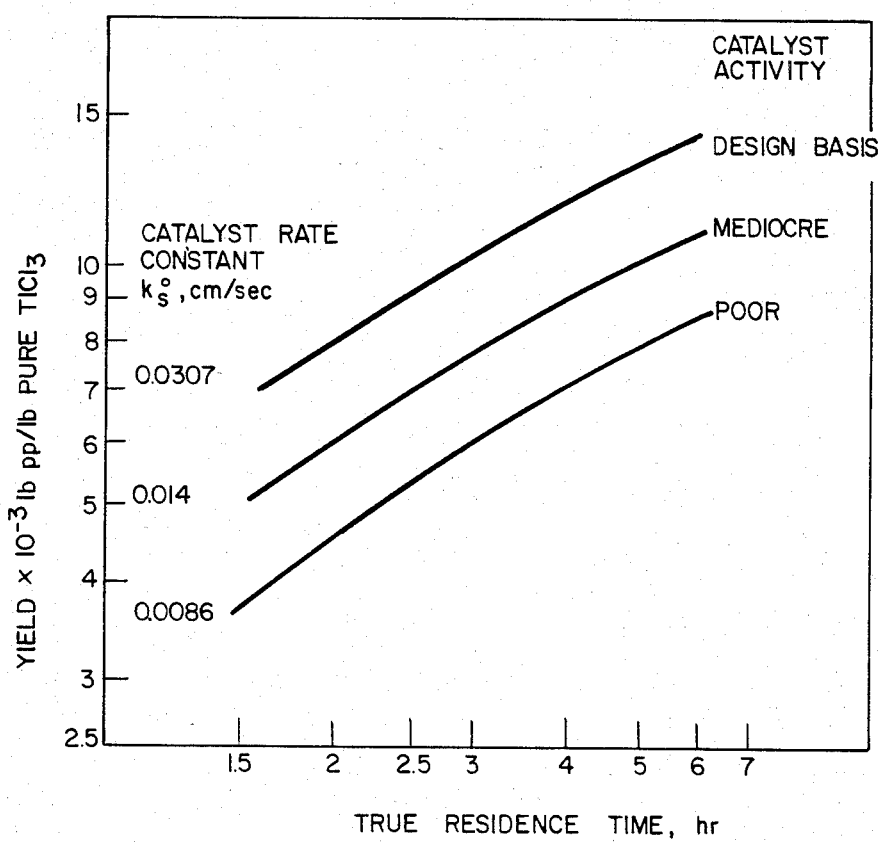
FIG. 4 shows a set of yield curves for polypropylene polymerization using different catalysts in such reactor as a function of residence time.

The graph shown in FIG. 4 indicates that for a production rate of 15,075 pounds per hour and a mediocre catalyst activity doubling the true residence time in the reactor from two hours to four hours is expected to decrease the catalyst residue in the polymeric product by 34 percent. Actual measurements indicate a 40 percent decrease in catalyst residue.

The embodiments of the polymer bed level control method of the invention provide several advantages over previously known constant bed level operation. The advantages include allowing flexibility in controlling polymer bed level and residence time as required for optimizing the polymerization process, improving polymeric product quality by allowing higher catalyst yields and lower catalyst residue in the product, and allowing more product grades to be produced by the vapor phase process. Furthermore, the retaining weir included in the known discharge system previously used for controlling polymer bed level can be eliminated.

While the invention is described in connection with the specific Examples above, it is to be understood that these are for illustrative purposes only. Many alternatives, modifications, and variations will be apparent to those skilled in the art and such alternatives, modifications, and variations are considered to fall within the spirit and scope of the appended claims.

What is claimed is:

1. A method for discharging polymeric product in powdered form from the take-off end of a horizontal vapor phase polymerization stirred-bed reactor comprising the steps of:
   (a) setting a rate for discharging powdered polymerized monomer when the reactor is operating in a steady state so as to maintain a powder level above a discharge port at the take-off end of the reactor; and
   (b) actuating a take-off zone discharge apparatus at the set rate for removing powdered polymerized monomer from the discharge port below the powder level;
thereby reducing gas blowby.

2. The method of claim 1, the reactor being divided into at least two polymerization sections by at least one barrier, wherein the rate is set sufficiently slowly to maintain a desired polymerized monomer bed level above the barrier, thereby increasing residence time.

3. A method for discharging polymeric product in powdered form from the take-off end of a horizontal vapor phase polymerization stirred-bed reactor comprising the steps of:
 (a) sensing the level of the powdered polymerized monomer bed when the reactor is operating in a steady state so as to maintain a powder level above a discharge port at the take-off end of the reactor, the bed level being correlated to the force required for stirring the polymerized monomer; and
 (b) actuating a take-off zone discharge apparatus for removing powdered polymerized monomer from the discharge port in response to the sensed bed level for maintaining a powder level above the discharge port;
thereby reducing gas blowby.

4. The method of claim 3 wherein the level of the powdered polymerized monomer bed is correlated to the current drawn by an electrical motor driving an agitator for stirring the bed.

5. The method of claim 3, the reactor being divided into at least two polymerization sections by at least one barrier, wherein the polymerized monomer bed level is maintained at a desired level above the barrier, thereby increasing residence time.

6. The method of claim 5 wherein the level of the powdered polymerized monomer bed is correlated to the current drawn by an electrical motor driving an agitator for stirring the bed.

7. A method for polymerizing at least one polymerizable monomer in the vapor phase comprising the steps of:
 (a) introducing a polymerizable monomer into a horizontal reactor, the reactor being divided into at least two sections by at least one barrier;
 (b) agitating the polymerized monomer bed;
 (c) removing off-gas along the topward portion of the reactor;
 (d) recycling the off-gas and introducing the recycled off-gas along the bottomward portion of the reactor;
 (e) introducing at least one catalyst into the reactor;
 (f) introducing quench liquid into each of the sections of the reactor; and
 (g) selectively taking off polymerized monomer migrated to the take-off end of the reactor along the bottomward portion of the reactor by opening a drain valve means and operating an automatic discharge ball valve means, connected in series with the drain valve means to a discharge port in the reactor, between an open position and a closed position for discharging polymerized monomer in powdered form.

8. The method of claim 7 wherein the automatic discharge ball valve means is actuated for discharging powdered polymerized monomer at a rate sufficiently slowly to maintain a powder level above the discharge port.

9. The method of claim 8 wherein the automatic discharge ball valve means is cycled for discharging powdered polymerized monomer at a rate fixed by a timer circuit, set when the reactor is operating in a steady state, for discharging powdered polymerized monomer at a rate sufficiently slowly to maintain a powder level above the discharge port.

10. The method of claim 8 wherein the automatic discharge ball valve means is operated for discharging powdered polymerized monomer at a rate fixed by an amperage indicator controller circuit, responsive to the polymerized monomer bed level when the reactor is operating in a steady state, for discharging powdered polymerized monomer at a rate sufficiently slowly to maintain a powder level above the discharge port.

11. The method of claim 7 wherein the automatic discharge ball valve means is actuated for discharging powdered polymerized monomer at a rate sufficiently slowly to maintain a desired polymerized monomer bed level above the barrier.

12. The method of claim 11 wherein the automatic discharge ball valve means is cycled for discharging powdered polymerized monomer at a rate fixed by a timer circuit, set when the reactor is operating in a steady state, for discharging powdered polymerized monomer at a rate sufficiently slowly to maintain a desired polymerized monomer bed level above the barrier.

13. The method of claim 11 wherein the automatic discharge ball valve means is operated for discharging powdered polymerized monomer at a rate fixed by an amperage indicator controller circuit, responsive to the polymerized monomer bed level when the reactor is operating in a steady state, for discharging powdered polymerized monomer at a rate sufficiently slowly to maintain a desired polymerized monomer bed level above the barrier.

* * * * *